(No Model.)
A. VANE & D. GUNDELFINGER.
GRAIN AND MALT DRIER.
No. 263,631. Patented Aug. 29, 1882.
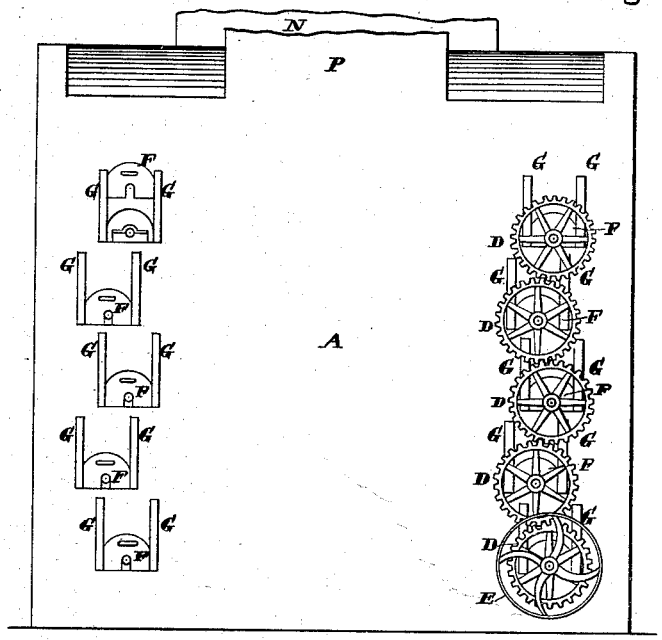
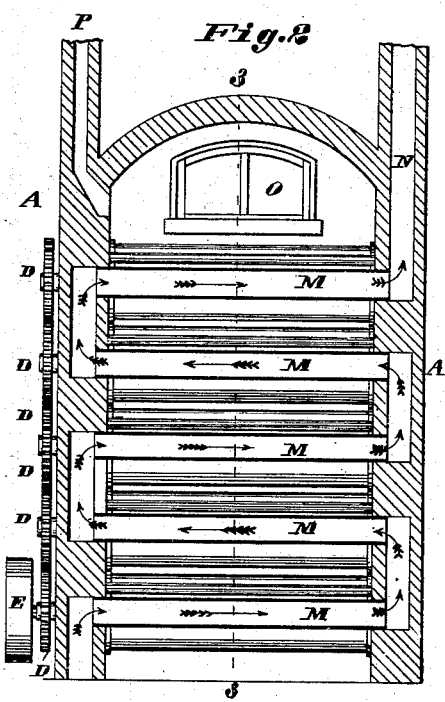
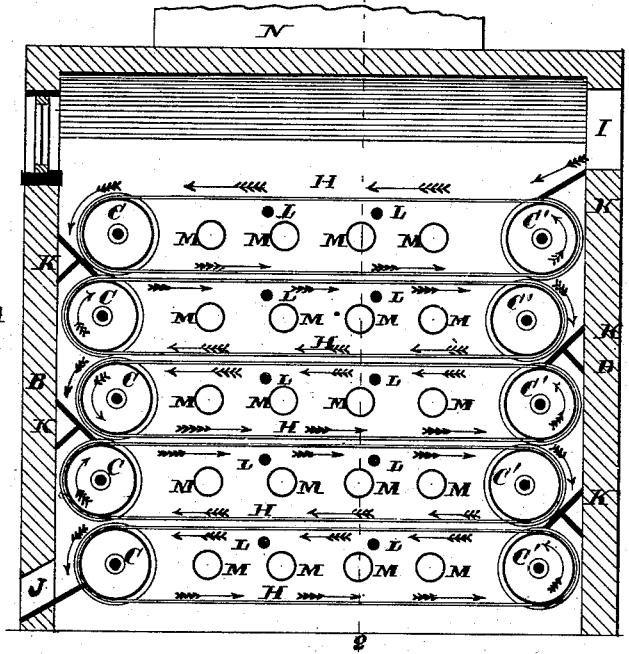
Attest:
Charles Pickles
Wm. S. Sayers
Inventor:
Atwood Vane
Daniel Gundelfinger
By Knight Bros.

UNITED STATES PATENT OFFICE.

ATWOOD VANE AND DANIEL GUNDELFINGER, OF ST. LOUIS, MISSOURI; SAID GUNDELFINGER ASSIGNOR TO SAID VANE.

GRAIN AND MALT DRIER.

SPECIFICATION forming part of Letters Patent No. 263,631, dated August 29, 1882.

Application filed July 22, 1882. (No model.)

*To all whom it may concern:*

Be it known that we, ATWOOD VANE and DANIEL GUNDELFINGER, both of the city of St. Louis, in the State of Missouri, have invented a certain new and useful Improvement in Grain and Malt Driers, of which the following is a full, clear, and exact description, reference being had to the accompanying drawings, forming part of this specification, and in which—

Figure 1 is a side elevation of a drying-room, showing the ends of rollers or drums that carry endless aprons and the gearing. Fig. 2 is a transverse vertical section taken on line 2 2, Fig. 3, and Fig. 3 is a longitudinal vertical section taken on line 3 3, Fig. 2.

Our invention relates to an apparatus for drying grain and malt; and it consists in a series of endless aprons crossing a drying-room heated by transverse pipes, the whole being arranged as hereinafter more fully described by referring to the accompanying drawings, in which—

A represents the sides, and B the ends, of the drying-room.

C C' are rollers or drums arranged one above another, and journaled in the sides of the room, one set near each end. One set of the rollers have on one end a train of cog-wheels, D, for turning them, and one of the rollers of this set has a driving-pulley, E. The rollers are all journaled in suitable boxes, and each box is covered by a plate, F, held in place and sliding in strips G, secured to the sides of the room. Upon these rollers are endless aprons H, as shown in Fig. 3. The grain or malt is delivered onto the top apron through an opening, I, in one end of the room, and is carried by it across the drying-room and delivered onto the apron beneath, which carries it across the room in the other direction and delivers it onto the next apron, and so on, it being received from the last apron by a spout or chute, J, which conveys it from the room. The rollers are so locked vertically that the receiving end of one apron projects beyond the delivery end of the one above, and in this way the material being dried is easily delivered from one apron onto another; and to further insure this safe delivery we arrange a chute, K, above the receiving end of each apron, as shown in Fig. 3. The directions the belts move in are shown by arrows; and we prefer to arrange rods L beneath the upper part of each belt or apron to support them between the drums when heavily loaded.

M represents heating-pipes arranged in vertical series, crossing and recrossing the room between the aprons. These pipes are supported in the ends of the room, and heated air, being supplied to them, passes therethrough, as shown by the arrows, Fig. 2, and escapes through a flue, N.

O is a window in the other end of the room from the receiving-opening I, by which the temperature of the room can be regulated, and heat may also escape from the room through a flue, P.

If desired, one set of the rollers may be journaled in sliding boxes, which would be provided with set-screws, so that by turning the screws the sets of rollers would be moved farther apart, and the carrying belts or aprons thus tightened.

Windows may also be placed in the sides of the rooms, so that the condition of the malt or grain can be easily ascertained.

We claim as our invention—

In a drying apparatus, the combination of drums C C', aprons H, receiving-opening I, chutes K and J, heating-pipes M, and flues N P, the whole being arranged and operating substantially as shown and described.

ATWOOD VANE.
DANIEL GUNDELFINGER.

Witnesses:
SAML. KNIGHT,
GEO. H. KNIGHT.